United States Patent [19]
Potter

[11] 4,440,038
[45] Apr. 3, 1984

[54] LEAD SCREW AND FOLLOWER ASSEMBLY

[75] Inventor: John T. Potter, Locust Valley, N.Y.

[73] Assignee: Iquad Company Incorporated, Locust Valley, N.Y.

[21] Appl. No.: 310,189

[22] Filed: Oct. 9, 1981

[51] Int. Cl.³ .................... F16H 1/18; F16H 27/02; F16H 1/20
[52] U.S. Cl. ............................. 74/424.8 R; 74/89.15
[58] Field of Search ............... 74/424.8 R, 424.8 VA, 74/424.8 C, 424.8 UZ, 424.8 B, 89.15

[56] References Cited

U.S. PATENT DOCUMENTS

| | | | |
|---|---|---|---|
| 3,308,674 | 3/1967 | Maroth | 74/424.8 R |
| 3,329,036 | 7/1967 | Whittaker | 74/424.8 R |
| 3,443,443 | 5/1969 | Spence | 74/89 |
| 3,648,535 | 3/1972 | Maroth | 74/424.8 R |
| 4,052,906 | 10/1977 | Genini | 74/89.15 |
| 4,322,987 | 4/1982 | Gartner | 74/424.8 R |
| 4,349,284 | 9/1982 | Andersson | 74/424.8 R |

Primary Examiner—Lawrence J. Staab
Assistant Examiner—Michael D. Bednarek
Attorney, Agent, or Firm—Nolte, Nolte and Hunter

[57] ABSTRACT

A lead screw and follower assembly employs a specially formed helical thread and a follower assembly employing bearings which ride on the several surfaces of the helical thread, thereby providing essentially frictionless motion and also preventing deflection of the lead screw during operation. The lead screw is preferably formed of a synthetic material such as polycarbonate incorporating glass fibers and the bearings are either roller or ball bearings.

3 Claims, 5 Drawing Figures

LEAD SCREW AND FOLLOWER ASSEMBLY

BACKGROUND OF THE INVENTION

The present invention relates generally to mechanical assemblies and particularly to mechanical assemblies that achieve rapid and accurate linear translatory motion from a rotary input.

It is well known that one approach to moving an element back and forth along a straight line is to use a lead screw and follower arrangement. Typically such lead screw is formed as a rod having a standard machine thread, and the follower is a nut or tapped element having the same thread as the lead screw. The orientation of the nut is maintained and the lead screw rotated, thereby imparting translational motion to the follower as it is driven by the continuous thread along the rotating rod. In order to provide the necessary strength, the lead screw and follower elements are generally formed of steel. Additionally, to avoid backlash a tight fit is usually present between the nut and threaded rod. Accordingly, a relatively high amount of friction is present. Lubricants can reduce this only a certain amount, and the remaining friction in the mechanism must simply be tolerated. Additionally, in order to permit a useful amount of translational travel, the typical lead screw is quite long in relation to its diameter and, thus, there is a certain bending or deflection present along the unsupported length of the lead screw.

If a high thread angle is used to permit fewer turns of the thread to produce a given linear motion, the friction becomes high.

Moreover, since the lead screw and follower are formed of steel there are relatively large inertial forces present, and the speed of response for the assembly, due to the mass of the lead screw and follower, is relatively slow.

SUMMARY OF THE INVENTION

The present invention provides a lead screw and follower assembly that departs from the heretofore known lead screw and follower arrangement by providing a lead screw formed of a synthetic material that has a specially designed nonconventional helical ridge for driving the follower. The follower is not a conventional nut or tapped element and includes specially arranged low friction roller or roller bearings, which are arranged on the various surfaces of the helix, to drive the follower, to eliminate bending, and to support the rod. The follower is formed of roller bearings and roller bearings which are arranged inside a hollow octagonal support or frame assembly. By forming the lead screw of synthetic material, the inertia of the assembly is lowered considerably and, by using roller bearings and roller bearings, the friction involved in the conversion of rotational to translational motion is reduced and to rolling contact. Sliding contact between the nut and thread is eliminated.

Therefore, it is an object of the present invention to provide a lead screw and follower assembly which has a low inertia, is suitable for high-speed use, and has a fast response time.

It is another object of the present invention to provide a lead screw and follower assembly which has extremely low friction between the following and the driving elements.

It is another object of the present invention to provide a lead screw and follower assembly wherein the follower assembly employs roller bearings arranged to limit deflection of the lead screw.

The manner in which these and other objects are accomplished by the present invention will be seen from the following detailed description.

DETAILED DESCRIPTION OF THE INVENTION

Figure 1:
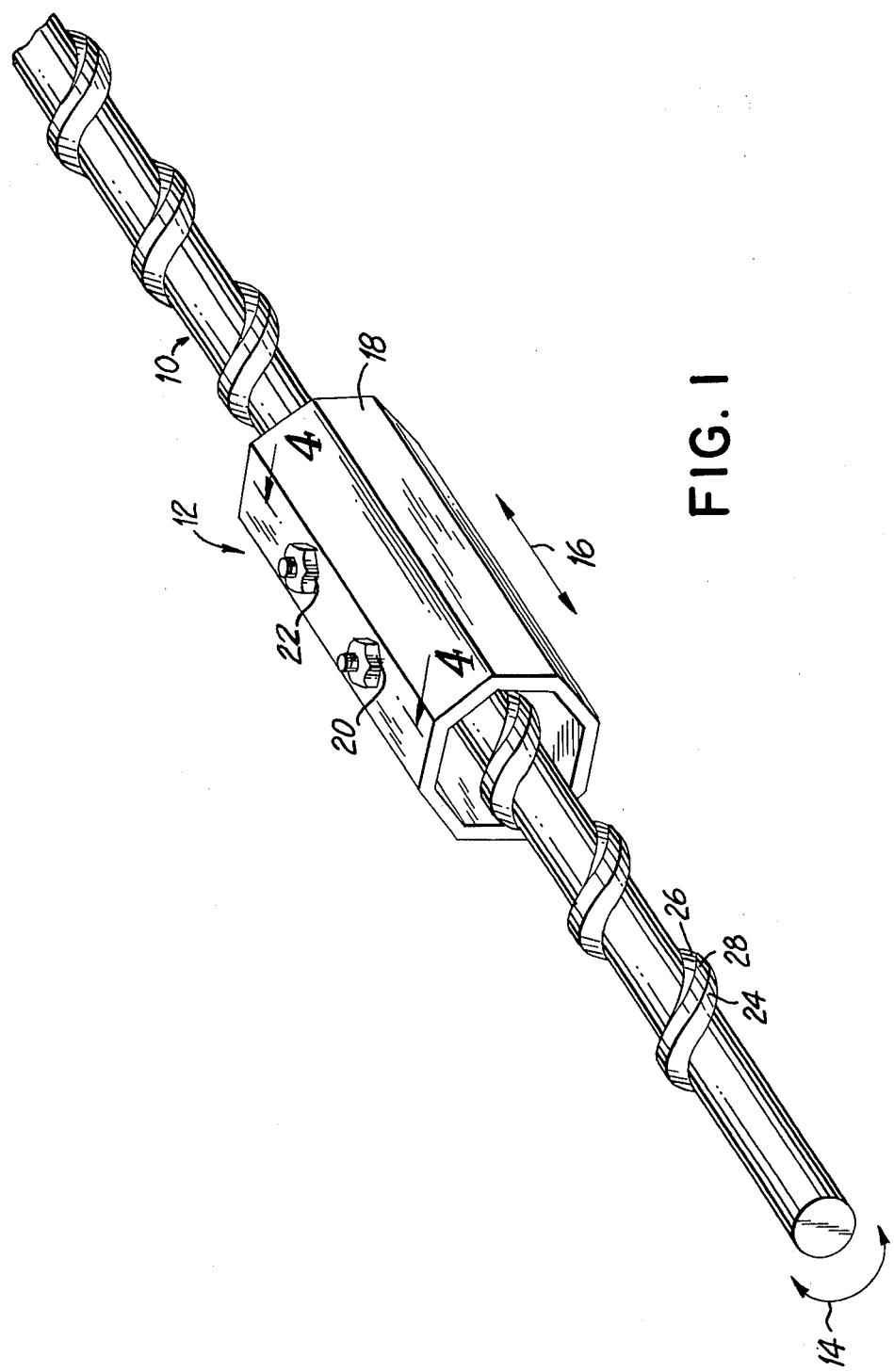
FIG. 1 is a perspective of the inventive lead screw and follower assembly.

FIG. 1 is a perspective of the inventive assembly with the lead screw 10 formed with the specially designed helical ridge and having the follower assembly 12 arranged for operation. The lead screw 10 is intended to be rotated in either direction as indicated by arrow 14, thereby causing the follower 12 to move longitudinally in either direction, as represented by arrow 16. The lead screw 10 is preferably formed of a synthetic material, such as a polycarbonate containing approximately forty percent glass fiber. Alternatively, Delrin A.F., a synthetic material having properties similar to nylon or a strong, free machining aluminum could be used. The ends of the lead screw 10 are simply shown at the root diameter, however, these ends may be left at the larger diameter before machining or the ends can have gears or sprockets affixed thereto. A length of the lead screw 10 is shown in greater detail in FIG. 2. The helix is preferably machined to have a one-inch pitch, with the lead screw having approximately a $\frac{3}{4}$ inch diameter.

The follower assembly 12 includes an outer hollow, octagonal frame 18, with the several bearings being arranged inside. The upper bearings, that ride on the flat side slopes of the helical ridge are secured to the octagonal frame 18 by bolts 20 and 22. The slanted sides against which the upper bearing ride are shown typically at 24 and 26. Additional bearings (not shown) are provided inside the frame 18 that ride on the narrow continuous flat strip 28 of the helix. While no operating mechanism is shown mounted on the follower assembly, the invention is adaptable to numerous uses, such as a typewriter or a chart recorder by arranging the particular functional unit on the octagonal frame 18.

Figure 2:
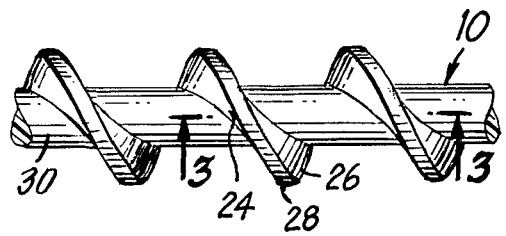
FIG. 2 is a detail of the lead screw of FIG. 1.

FIG. 2 shows the manner in which the helical ridge has been machined, resulting in a base shaft 30 with a helix appearing to be placed on its outer surface. In the preferred embodiment, one complete turn of the helix is accomplished for each one inch of length of the base shaft 30 or, stated another way, each three hundred and sixty degrees of rotation of the shaft produces one inch of linear travel. The flat outer face 28, against which the lower bearings ride, it preferaby approximately one tenth of an inch in width.

Figure 3:
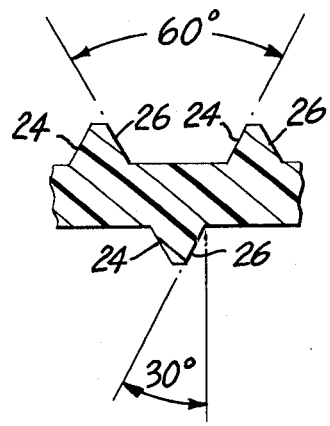
FIG. 3 is a cross section of a portion of the lead screw of FIG. 2 taken through lines 3—3.

FIG. 3 is a cross section through a portion of the detail of FIG. 2, wherein the angles of the surfaces of the helical ridge that have been machined on the shaft may be seen more clearly. Specifically it may be seen that the symmetrical layout is such that an angle of sixty degrees exists between facing sides 26, 24 of successive peaks of the helix with each individual face being at an angle of thirty degrees to a perpendicular to the longitudinal axis of the shaft. Again, it is these slanted, continuous side faces 24, 26 of the helix against which the upper bearing elements of the follower are in contact. Therefore, these slanted lateral faces 24, 26 act to drive the follower over the length of the rotating shaft.

Figure 4:
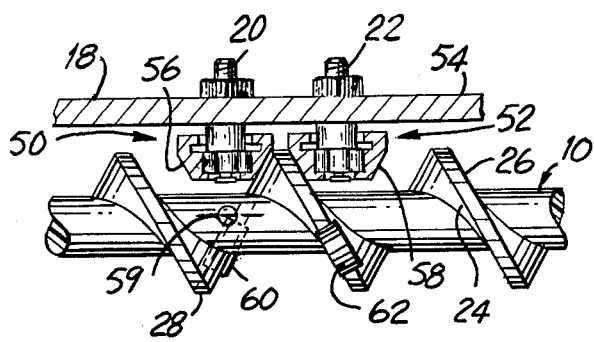
FIG. 4 is a detail of the follower of FIG. 1 in cross section taken through lines 4—4.

This driving action is seen in FIG. 4, wherein the helical rod 10 of FIG. 1 is shown in relation to the actual operating elements of the follower 12. In FIG. 4, the two upper bearings are shown in relation to the two continuous side faces 24, 26 of the helix. Specifically, two tapered conical ball bearings 50, 52 are bolted at 20 and 22 to a top flat side 54 of the octagonal follower frame 18. Each bearing has an outer race 56, 58, respectively, which has been ground to the appropriate conical taper corresponding to the thirty degree angle of the individual side faces of the helical ridge, as shown in FIG. 3. Thus, it may be seen that when the two tapered outer races 56, 58 of the follower arrangement contact only the outer flat surfaces 24, 26 of the helix the entire follower arrangement is thereby centered and all forces acting on the helix also act to center the follower on the threaded rod, thereby eliminating bending, supporting the rod, and thus preventing deflection. Operating on the continuous, helical flat surface 28 of the threaded rod 10 are two roller bearings 60, 62. These bearings 60, 62 are located on opposite sides of the helically threaded rod, thus, bearing 60 is shown in phantom in FIG. 4. The elements used to retain the two roller bearings 60, 62 in the octagonal frame 18 are not shown in FIG. 4, since such bearing mounting hardware is well known. Note also in FIG. 4 that the angle of the outer races 56, 58 of the tapered conical bearings 50, 52 intercepts the centerline of the lead screw or worm 10, as exemplified by the intersection within circle 59. This results in pure rolling friction.

Figure 5:
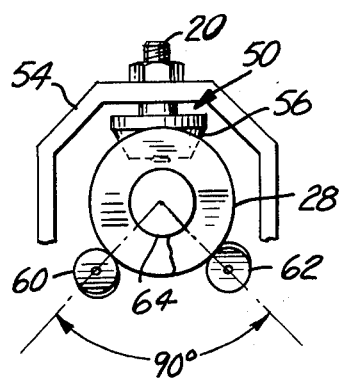
FIG. 5 is a schematic showing of the bearings as arranged in the follower in relation to the lead screw of FIG. 1.

In FIG. 5 the two bearings 60, 62 ride on the continuous flat helical surface 28. The base or root diameter of the helical shaft being seen at 64. Similarly, the tapered bearing 50 is also seen partially in phantom. These bearings 60, 62 both ride on the continuous flat surface 28 of the helical ridge and support and maintain alignment of the shaft, without loading it and without adding any appreciable friction. The angle subtended by the two bearings 60, 62 is preferably ninety degrees.

Therefore, in operation and upon rotation of the helical lead screw, the two tapered bearings ride upon the outer continuous slanted surfaces of the helix, while the two opposed ball bearings ride on the outer continuous narrow flat strip which is also a part of the helical ridge. In this way, friction is substantially eliminated due to the use of roller and roller bearings and by forming the helical rod of a low friction material.

It is understood that the foregoing is presented by way of example only and is not intended to limit the scope of the present invention, except as set forth in the appended claims.

What I claim is:

1. Screw and follower apparaus, comprising:
   a shaft radially flexible along the length thereof and having a helical ridge formed of three continuous surfaces uniformly longitudinally arranged on the surface of said shaft for forming a lead screw;
   said surfaces comprising a flat outer helical surface and two slanted sides extending outwardly from said outer helical surface to the root of said shaft;
   follower means including a frame member substantially coaxially arranged with said shaft and a plurality of bearing means mounted on said frame member and in contact with said three surfaces of said helical ridge for linearly translating said follower upon rotation of said shaft and for stabilizing said shaft against flexing;
   said plurality of bearing means comprising a pair of conical roller bearings having tapered outer race surface means for rolling line contact against said slanted sides of said helical ridge;
   means mounting said pair of conical roller bearings to said frame member with their axes normal to the axis of said shaft and in a common plane, longitudinal spaced relation for stradling a single raised portion of said ridge and for bearing in a direction substantially normal to the axis of said shaft in rolling line contact against opposite slanted sides extending from a common portion of said flat outer helical surface of said ridge substantially along the length of said ridge as said shaft is rotated;
   said bearing means further comprising a pair of cylindrical roller bearings having outer circular race surface means for rolling line contact against said flat outer helical surface of said ridge;
   means mounting said pair of cylindrical roller bearings to said frame member with their axes angled for bearing in a direction opposite to the bearing direction of said conical roller bearings in rolling line contact against said flat outer helical surface on opposite sides of the axis of said shaft for substantially the length thereof as said shaft is rotated;
   said bearing means constituting opposing bearing means preventing flexure of said shaft within said frame.

2. The apparatus of claim 1, wherein said two slanted sides are arranged at thirty degrees with respect to a perpendicular to the axis of said shaft.

3. The apparatus of claim 1, wherein said shaft is formed of polycarbonate material including glass fibers, said shaft and said helical ridge being formed of a single piece of said polycarbonate material.

* * * * *

UNITED STATES PATENT AND TRADEMARK OFFICE
CERTIFICATE OF CORRECTION

PATENT NO. : 4,440,038
DATED : April 3, 1984
INVENTOR(S) : John T. Potter

It is certified that error appears in the above-identified patent and that said Letters Patent is hereby corrected as shown below:

Column 4, line 27, after "plane," insert -- in --.

Signed and Sealed this

Sixth Day of November 1984

[SEAL]

*Attest:*

*Attesting Officer*

GERALD J. MOSSINGHOFF

*Commissioner of Patents and Trademarks*